(12) United States Patent
Kato et al.

(10) Patent No.: US 7,691,531 B2
(45) Date of Patent: Apr. 6, 2010

(54) ALKALINE PRIMARY BATTERY INCLUDING A SPHERICAL NICKEL OXYHYDROXIDE

(75) Inventors: Fumio Kato, Kadoma (JP); Shigeto Noya, Neyagawa (JP)

(73) Assignee: Panasonic Corporation, Osaka (JP)

( * ) Notice: Subject to any disclaimer, the term of this patent is extended or adjusted under 35 U.S.C. 154(b) by 896 days.

(21) Appl. No.: 10/567,347

(22) PCT Filed: Jul. 5, 2004

(86) PCT No.: PCT/JP2004/009882

§ 371 (c)(1),
(2), (4) Date: Feb. 6, 2006

(87) PCT Pub. No.: WO2005/015666

PCT Pub. Date: Feb. 17, 2005

(65) Prior Publication Data
US 2008/0193842 A1    Aug. 14, 2008

(30) Foreign Application Priority Data
Aug. 6, 2003    (JP) .............................. 2003-287568

(51) Int. Cl.
H01M 4/02    (2006.01)
H01M 4/58    (2010.01)
H01M 4/00    (2006.01)

(52) U.S. Cl. ..................... 429/209; 429/218.1; 429/223

(58) Field of Classification Search .................. None
See application file for complete search history.

(56) References Cited

U.S. PATENT DOCUMENTS 6,074,785 A * 6/2000 Dansui et al. ............... 429/223
6,471,890 B2 10/2002 Tanigawa et al.
6,566,009 B1 5/2003 Noya et al.
2002/0024041 A1 * 2/2002 Tanigawa et al. ............. 252/512
2004/0101754 A1 * 5/2004 Yamamoto ................... 429/223

FOREIGN PATENT DOCUMENTS

EP    0831542 A1 *    3/1998

(Continued)

OTHER PUBLICATIONS

IPDL PAJ JPO Machine Translation for Sei et al. (JP10-270042 A).*

(Continued)

*Primary Examiner*—Dah-Wei D Yuan
*Assistant Examiner*—Adam A Arciero
(74) *Attorney, Agent, or Firm*—McDermott Will & Emery LLP (57) ABSTRACT

This invention relates to an alkaline battery including spherical nickel oxyhydroxide that includes crystals having a β-type structure. In a powder X-ray diffraction profile of the spherical nickel oxyhydroxide obtained using a Cu target, a half-width W of a diffraction peak P derived from a (001) plane is 0.6° or less. The ratio H/W of a height H of the peak P to the half-width W is 10,000 or more. The nickel contained in the spherical nickel oxyhydroxide has a mean valence of 2.95 or more. The use of such nickel oxyhydroxide in an alkaline battery results in a battery having excellent heavy-load discharge characteristics and improved energy densities.

6 Claims, 2 Drawing Sheets

FOREIGN PATENT DOCUMENTS

| | | | |
|---|---|---|---|
| EP | 0 940 865 A2 | | 9/1999 |
| JP | 57-72266 A | | 5/1982 |
| JP | 10270042 A | * | 10/1998 |
| JP | 11-246226 A | | 9/1999 |
| JP | 2001-15106 A | | 1/2001 |
| JP | 2001-325954 A | | 11/2001 |
| JP | 2002-110154 | | 4/2002 |
| JP | 2002-203546 | * | 7/2002 |
| JP | 2002-338252 A | | 11/2002 |
| JP | 2003-17079 A | | 1/2003 |
| JP | WO/2003/044883 | * | 5/2003 |
| WO | WO 02/41422 A1 | | 5/2002 |
| WO | WO 02/069420 A1 | | 9/2002 |

OTHER PUBLICATIONS

B.D. Cullity, Elements of X-Ray Diffraction, Second Edition, Addison-Wesley Publishing Company, Inc., Massachusetts, 1978, pp. 29, 88, 101-104, 110, 135, 136, 139-143, 151, 178, 194, 195, 199-213, 398-403.*

IPDL PAJ JPO Machine Translation for JP 2002-203546 (Jul. 2002), Hayashi, Naoteru.*

Chinese Office Action, issued in corresponding Chinese Patent Application No. 2004800225688 mailed on Nov. 16, 2007.

Canadian Office Action issued in Canadian Patent Application No. 2,534,669 dated Jan. 28, 2009.

* cited by examiner

ALKALINE PRIMARY BATTERY INCLUDING A SPHERICAL NICKEL OXYHYDROXIDE

RELATED APPLICATION

This application is the U.S. National Phase under 35 U.S.C. §371 of International Application No. PCT/JP2004/009882, filed on Jul. 5, 2004, which in turn claims the benefit of Japanese Application No. 2003-287568, filed on Aug. 6, 2003, the disclosures of which Applications are incorporated by reference herein.

TECHNICAL FIELD

The present invention relates to alkaline batteries containing nickel oxyhydroxide as a positive electrode active material, and particularly, to alkaline dry batteries such as nickel dry batteries and nickel manganese dry batteries.

BACKGROUND ART

Alkaline batteries, particularly alkaline batteries of the discharge-start type and alkaline primary batteries, have an inside-out type structure, in which cylindrical tablets of a positive electrode material mixture are disposed in a positive electrode case serving as a positive electrode terminal so as to closely adhere to the positive electrode case, and a gelled zinc negative electrode is disposed in the center thereof with a separator interposed therebetween.

With the recent proliferation of digital devices, there is a gradual increase in the load power of such battery-powered devices. Therefore, there is a demand for batteries having excellent heavy-load discharge performance.

In order to obtain alkaline batteries having excellent heavy-load discharge characteristics, for example, mixing nickel oxyhydroxide into the positive electrode material mixture has been proposed (see Japanese Laid-Open Patent Publication No. Sho 57-72266). Also, such batteries have recently been put into practical use.

Nickel oxyhydroxide used in alkaline batteries is obtained, for example, by oxidizing spherical or hen's egg-shaped nickel hydroxide by means of an oxidant, such as an aqueous solution of sodium hypochlorite. The spherical nickel hydroxide which is used as the raw material for such oxidation reaction is β-type nickel hydroxide having a high bulk density (tap density). When the β-type nickel hydroxide is oxidized, spherical nickel oxyhydroxide with a main structure of β-type is generated. The high-tap-density spherical nickel oxyhydroxide with a main structure of β-type thus obtained can be filled into the positive electrode at high densities.

Also, spherical nickel hydroxide with adequately controlled crystallinity is used in alkaline storage batteries to improve their high-temperature charge characteristics. The use of such spherical nickel hydroxide as the raw material makes it possible to obtain spherical nickel oxyhydroxide having a high oxidation number, i.e., a high discharge capacity.

The recent higher functionality of digital devices has created a demand for a further improvement in the discharge characteristics of alkaline batteries. With respect to alkaline batteries including the above-mentioned nickel oxyhydroxide, in particular, it is demanded to (1) improve their heavy-load discharge characteristics so as to be capable of a pulse discharge unique to digital devices and (2) enhance their capacity to allow for an increase in the power consumed by such devices.

To meet the former demand, the use of nickel oxyhydroxide coated with a cobalt oxide, cobalt oxyhydroxide, or the like has been proposed (see Japanese Laid-Open Patent Publication No. 2002-338252 and Japanese Laid-Open Patent Publication No. 2003-17079). The use of such nickel oxyhydroxide leads not only to an improvement in heavy-load discharge characteristics but also to an improvement in capacity.

With respect to the latter demand, improving the nickel oxyhydroxide material itself contained in the positive electrode material mixture has been under examination. For example, there has been a proposal of providing alkali metal ions between the crystals of β-type nickel oxyhydroxide to improve capacity (see Japanese Laid-Open Patent Publication No. 2001-325954).

Also, in order to enhance the energy density of the alkaline batteries containing nickel oxyhydroxide in their positive electrodes, the conditions of chemical oxidization of nickel hydroxide may be strengthened to heighten the oxidation number of nickel contained in nickel oxyhydroxide.

However, when the conditions of chemical oxidization are simply strengthened, for example, by increasing the concentration and amount of the oxidant used for the oxidation reaction and by heightening the temperature of the atmosphere, the crystallites having a β-type structure become finer, resulting in a decrease in the crystallinity of nickel oxyhydroxide.

Low-crystalline β-nickel oxyhydroxide has a large number of grain boundaries, which are a kind of defect. Such nickel oxyhydroxide locally includes γ-type structure crystal that is inactive and does not contribute to the discharge reaction. Therefore, even if the mean valence of nickel is seemingly high, sufficient discharge capacity cannot be obtained. In this way, the energy density of alkaline batteries cannot be heightened by merely heightening the mean valence of nickel contained in nickel oxyhydroxide Therefore, an object of the present invention is to provide an alkaline battery having excellent heavy-load discharge characteristics and improved energy densities by optimizing the physical properties of nickel oxyhydroxide.

DISCLOSURE OF INVENTION

The present invention relates to an alkaline battery including: a positive electrode including a positive electrode active material; a negative electrode including a negative electrode active material; a separator disposed between the positive electrode and the negative electrode; and an electrolyte. The positive electrode active material comprises spherical nickel oxyhydroxide that includes crystals having a β-type structure. A powder X-ray diffraction profile of the spherical nickel oxyhydroxide obtained using a Cu target is such that a half-width W of a diffraction peak P derived from a (001) plane is 0.6° or less. The ratio H/W of a height H of the peak P to the half-width W is 10,000 or more. The nickel contained in the spherical nickel oxyhydroxide has a mean valence of 2.95 or more. The half-width of the diffraction peak is defined as the difference in 2θ between the values that are half the extreme value of the diffraction peak height in the peak. The peak height is generally expressed in count/second (cps).

In the alkaline battery, the nickel contained in the spherical nickel oxyhydroxide preferably has a mean valence of 3 or more.

In the alkaline battery, the spherical nickel oxyhydroxide preferably carries a cobalt oxide, and the cobalt contained in the cobalt oxide preferably has a mean valence of greater than 3.

In the alkaline battery, the spherical nickel oxyhydroxide preferably carries the cobalt oxide in an amount of 0.5 to 15 parts by weight per 100 parts by weight of the spherical nickel oxyhydroxide.

In the alkaline battery, preferably, the positive electrode further contains at least one additive selected from the group consisting of zinc oxides, calcium oxides, yttrium oxides, and titanium oxides.

In the alkaline battery, the positive electrode preferably contains 0.1 to 10 parts by weight of the additive per 100 parts by weight of the spherical nickel oxyhydroxide.

BEST MODE FOR CARRYING OUT THE INVENTION

Figure 1:
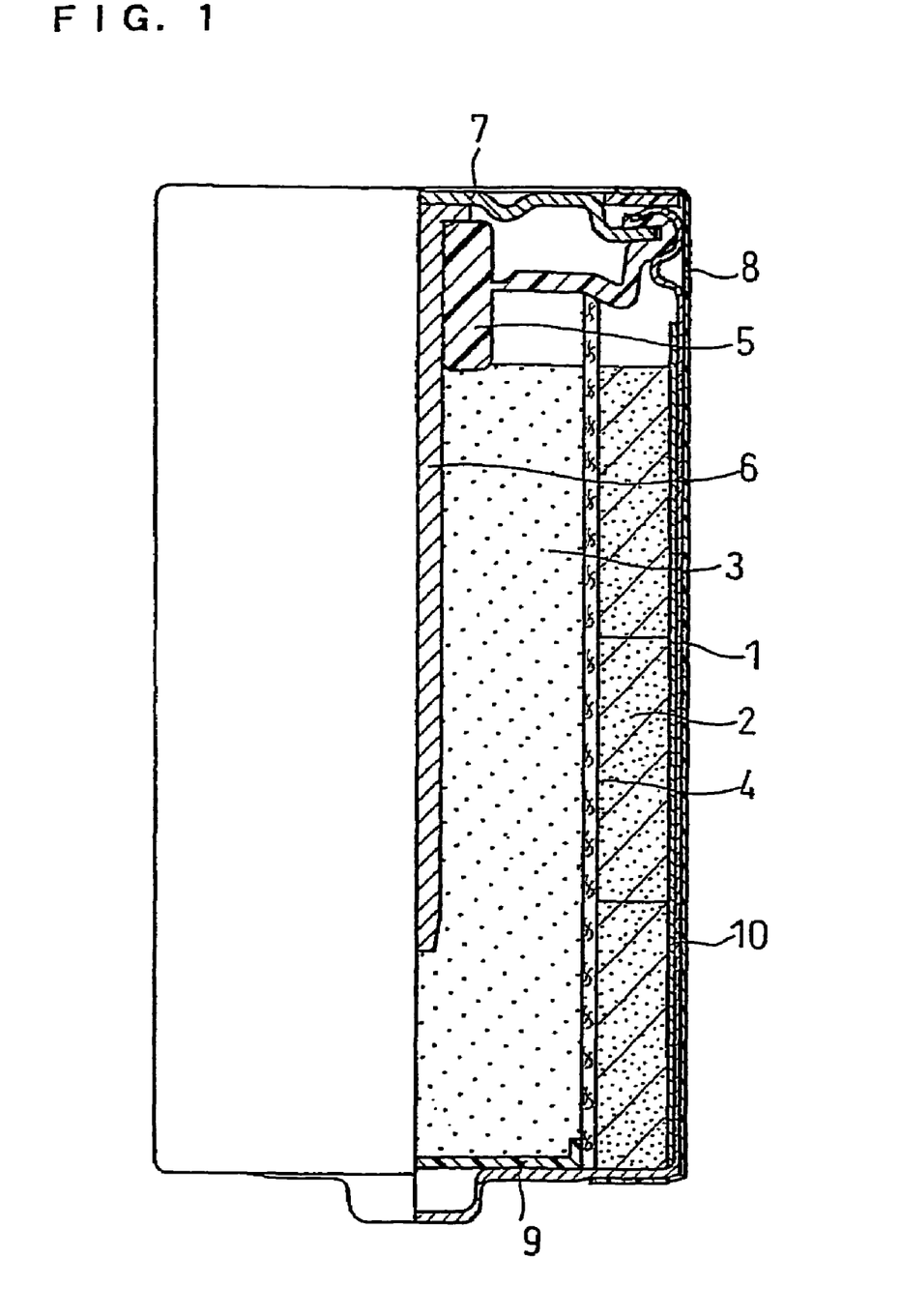
FIG. 1 is a partially cut-away front view of an alkaline battery in one embodiment of the present invention.

Referring now to FIG. 1, an example of an alkaline battery according to the present invention is described.

An alkaline battery of FIG. 1 comprises a power-generating element and a positive electrode case 1 accommodating the power-generating element. The power-generating element comprises a positive electrode material mixture 2, a gelled negative electrode 3, a separator 4 disposed between the positive electrode material mixture 2 and the gelled negative electrode 3, and an electrolyte (not shown in the figure).

The positive electrode case 1, which also serves as a positive electrode terminal, is in the shape of a bottomed cylinder having an indentation at the center of the bottom. The positive electrode material mixture 2 in the shape of a hollow cylinder is disposed inside the positive electrode case 1 so as to contact the positive electrode case 1. A graphite coating film 10 is formed between the positive electrode case 1 and the positive electrode material mixture 2.

The gelled negative electrode 3 is disposed inside the positive electrode material mixture 2 with the separator 4 interposed therebetween. Also, the gelled negative electrode 3 is insulated from the battery case 1 by an insulating cap 9.

A negative electrode current collector 6 is inserted in the gelled negative electrode 3. The negative electrode current collector 6 is integrated with a sealing plate 5 and a bottom plate 7 that also serves as a negative electrode terminal. The opening of the battery case 1 is sealed by crimping the opening edge of the battery case 1 onto the circumferential edge of the bottom plate 7 with the sealing plate 5 interposed therebetween. Also, the outer surface of the positive electrode case 1 is coated with a jacket label 8.

The above-mentioned electrolyte is used to wet the positive electrode material mixture 2 and the separator 4. As the electrolyte, any known one in the art may be used. One such example is an aqueous solution containing 40% by weight of potassium hydroxide.

As the gelled negative electrode 3, any known one in the art may be used. Examples of such gelled negative electrode include one made of poly (sodium acrylate) serving as a gelling agent, an alkaline electrolyte, and zinc powder serving as a negative electrode active material. The alkaline electrolyte used for the gelled negative electrode may be the same as or different from the above-mentioned electrolyte.

In the present invention, the positive electrode material mixture 2 comprises nickel oxyhydroxide and manganese dioxide.

Next, nickel oxyhydroxide, which is the positive electrode active material, is described.

In the present invention, the spherical nickel oxyhydroxide used as the positive electrode active material includes crystals having a β-type structure. In a powder X-ray diffraction profile of this spherical nickel oxyhydroxide, the half-width of the diffraction peak derived from the (001) plane is 0.6° or less, and the ratio ((peak height)/(half-width)), i.e., the ratio of the peak height of the diffraction peak derived from the (001) plane to the half-width, is 10,000 or more.

With highly crystalline, spherical nickel oxyhydroxide in which the half-width is 0.6° or less and the (peak height)/(half-width) is 10,000 or more, the reduction reaction of the nickel species proceeds smoothly during discharging. That is, the above-mentioned characteristic values lead to an improvement in the utilization rate of the nickel oxyhydroxide as the positive electrode active material. This further makes it possible to improve the heavy-load discharge characteristics of batteries containing such nickel oxyhydroxide.

On the other hand, when the half-width is greater than 0.6°, such nickel oxyhydroxide has a large number of defects, and it locally has an inactive structure (γ-type structure). In this case, it becomes difficult to obtain sufficient discharge capacity.

Further, when the (peak height)/(half-width) is less than 10,000, it is also difficult to obtain sufficient discharge capacity, in the same manner as the above-mentioned case where the half-width is greater than 0.6°.

Furthermore, the mean oxidation number (hereinafter referred to also as mean valence) of the nickel contained in the spherical nickel oxyhydroxide is 2.95 or more. Also, this mean valence is preferably 3 or more and 3.05 or less.

When the nickel contained in the nickel oxyhydroxide has a mean valence of 2.95 or more, it is possible to obtain batteries having a sufficiently high capacity commensurate with the valence. On the other hand, if the mean valence is less than 2.95, the capacity becomes insufficient.

As described above, the spherical nickel oxyhydroxide used in the present invention has a high mean valence of nickel and allows the reduction reaction of nickel to proceed smoothly. The use of such nickel oxyhydroxide enables alkaline batteries to have improved energy densities and excellent heavy-load discharge characteristics.

The mean particle size of the spherical nickel oxyhydroxide is preferably in a range of 8 to 20 µm, and the tap density thereof (500 times) is preferably in a range of 2.2 to 2.4 g/cm$^3$. When the mean particle size and the tap density are in such ranges, the filling density of the spherical nickel oxyhydroxide can be enhanced.

The spherical nickel oxyhydroxide may carry a cobalt oxide in which the mean valence of cobalt is greater than 3.0. Also, it is preferred that the mean valence of cobalt be 3.1 or more and 3.6 or less.

Cobalt oxides in which the mean valence of cobalt is greater than 3.0 have an extremely high electronic conductivity. Thus, when the spherical nickel oxyhydroxide carries such a cobalt oxide, it becomes possible to improve the current collecting characteristics of the spherical nickel oxyhydroxide. The use of nickel oxyhydroxide carrying such a cobalt oxide as the positive electrode active material makes it possible to obtain batteries having a higher capacity (higher utilization rate) and excellent heavy-load discharge characteristics. Also, cobalt oxides having a valence of 3.1 or more are highly chemically stable during battery storage. It is thus possible to obtain batteries having a high reliability even after storage at high temperatures.

On the other hand, cobalt oxides in which the average valence of cobalt is greater than 3.6 are difficult to produce.

Also, the amount of the cobalt oxide carried by the spherical nickel oxyhydroxide is preferably 0.5 to 15 parts by weight, and more preferably 1 to 5 parts by weight, per 100 parts by weight of the spherical nickel oxyhydroxide. By setting the carried amount in this range, the effect of the cobalt oxide carried by the spherical nickel oxyhydroxide can be fully exerted. That is, the utilization rate of the spherical nickel oxyhydroxide can be improved, and the discharge polarization upon heavy-load discharge can be reduced. Further, when the carried amount is in this range, even though carrying the cobalt oxide may cause an increase in the volume of the nickel oxyhydroxide, the utilization rate of the nickel oxyhydroxide can be increased more than the increase in volume. Thus, the volume energy density of the nickel oxyhydroxide can be enhanced. Accordingly, the use of such nickel oxyhydroxide enables alkaline batteries to have a particularly high capacity and excellent heavy-load discharge characteristics.

Also, the positive electrode of the above-mentioned alkaline battery preferably contains at least one additive selected from the group consisting of zinc oxides, calcium oxides, yttrium oxides, and titanium oxides. These additives can heighten the oxygen-generating overvoltage of the nickel oxyhydroxide. Thus, the self-decomposition reaction of the nickel oxyhydroxide can be suppressed. Accordingly, the inclusion of such an additive in the positive electrode makes it possible to suppress the leakage phenomenon and the decline in capacity when the battery is stored for an extended period of time at high temperature. That is, the addition of such an additive to the positive electrode enables a significant improvement in the reliability of the resultant alkaline battery.

The amount of the additive is preferably 0.1 to 10 parts by weight, and more preferably 0.5 to 3 parts by weight, per 100 parts by weight of the spherical nickel oxyhydroxide. When the amount of the additive is in this range, it is possible to fully suppress the self-decomposition reaction of the spherical nickel oxyhydroxide while keeping the decrease in the amount of the active material filled in the positive electrode to a minimum. That is, the self-decomposition reaction of the nickel oxyhydroxide can be suppressed without decreasing battery capacity.

In consideration of the balance of battery characteristics and prices, the contents of nickel oxyhydroxide and manganese dioxide are preferably 10 to 80% by weight and 20 to 90% by weight, respectively, of the total amount of nickel oxyhydroxide and manganese dioxide contained in the positive electrode material mixture. From the viewpoint of obtaining batteries having an excellent balance in characteristics, the contents of nickel oxyhydroxide and manganese dioxide are preferably 30 to 60% by weight and 40 to 70% by weight, respectively. This is because of the following reason. When manganese dioxide and nickel oxyhydroxide are compared, manganese dioxide is superior in terms of capacity per unit weight (mAh/g), the ease with which it is filled into the case, material prices, and the like. On the other hand, in terms of discharge voltage and heavy-load discharge characteristics, nickel oxyhydroxide is superior.

The mean valence of the nickel contained in nickel oxyhydroxide particles can be determined, for example, by the following gravimetric method (dimethylglyoxime method) and oxidation-reduction titration of nickel oxyhydroxide particles.

These methods are specifically described below.

(1) Measurement of Metal Weight Percent by Gravimetric Method (Dimethylglyoxime Method) and the Like Nickel oxyhydroxide particles are added to an aqueous solution of nitric acid, and the resultant solution is heated to dissolve the nickel oxyhydroxide particles.

An aqueous solution of tartaric acid and ion-exchanged water are added to the solution thus obtained to adjust the volume thereof, and thereafter, ammonia water and acetic acid are added to this solution to keep the pH of the solution weakly acid (pH=4 to 6).

At this time, this solution may contain ions that can possibly cause measurement errors. For example, when the ions that can possibly cause measurement errors are cobalt ions, potassium bromate is added to oxidize the cobalt ions to a trivalent state. This can prevent the formation of a complex of cobalt ions and dimethylglyoxime.

Next, while this solution is heated and stirred, an ethanol solution of dimethylglyoxime is added thereto to precipitate nickel ions as a complex compound of dimethylglyoxime.

Subsequently, the resultant precipitate is collected by suction filtration. The collected precipitate is dried in an atmosphere of 110° C., and then, the weight of the precipitate is measured.

The weight percent of nickel contained in a predetermined amount of nickel oxyhydroxide particles is calculated by the following equation:

$$\text{Nickel weight percent} = \{\text{deposit weight }(g) \times 0.2032\} / \{\text{nickel oxyhydroxide particle weight }(g)\}$$

The content of an added metal that is contained in small amounts, such as cobalt or zinc, can be measured as follows.

First, nickel oxyhydroxide particles are dissolved in a solution of nitric acid. By subjecting the resultant solution to an ICP emission analysis, the content of the added metal can be determined with good accuracy.

(2) Measurement of Mean Nickel Valence by Oxidation-Reduction Titration

Potassium iodide and sulfuric acid are added to nickel oxyhydroxide particles, and by stirring the mixture sufficiently, the nickel oxyhydroxide particles are completely dissolved. In this process, nickel ions having a valence higher than bivalence oxidize potassium iodide to iodine and, at the same time, are reduced to bivalence.

Subsequently, the generated iodine is subjected to titration with a 0.1 mol/L aqueous solution of sodium thiosulfate. The titer reflects the amount of electrons that the nickel and cobalt ions have received from the iodide ions until the nickel and cobalt ions are reduced to bivalence. That is, the titer reflects the amount of the nickel and cobalt having a valence greater than bivalence.

Thus, by using the value of the metal weight percent obtained in the above (1) and assuming that the cobalt in the nickel oxyhydroxide has a valence of 3.5, the mean valence of the nickel contained in the nickel oxyhydroxide can be determined.

Example 1

Preparation of Nickel Oxyhydroxide Solid Solution

An aqueous ammonia solution of nickel sulfate (an aqueous solution in which $Ni^{2+}$ exists as an ammine complex), an aqueous ammonia solution of cobalt sulfate, an aqueous ammonia solution of zinc sulfate, and an aqueous solution of sodium hydroxide were supplied to a reaction vessel equipped with stirring blades by a pump. At this time, the amounts of the respective solutions supplied were adjusted such that the reaction solution in the reaction vessel had a predetermined pH.

The reaction solution in the reaction vessel was sufficiently stirred with the stirring blades, to precipitate spherical nickel hydroxide (β-type) particles. By further continuing the stirring, the nickel hydroxide particles were allowed to grow. The resultant spherical nickel hydroxide included cobalt and zinc that were dissolved in its crystals in the state of solid solution.

Next, the particles thus obtained were put into an aqueous solution of sodium hydroxide contained in another reaction vessel, where the solution was heated to remove sulfate ions. Thereafter, these particles were washed with water and dried to obtain spherical nickel hydroxide solid solution particles. The amount of cobalt contained in the solid solution particles was adjusted to 1% of the total weight of metal elements of nickel, cobalt, and zinc. Also, the amount of zinc was adjusted to 3% of the total weight of the metal elements.

The mean particle size of the spherical nickel hydroxide solid solution particles thus obtained was measured with a laser diffraction particle size distribution analyzer. As a result, the mean particle size on a volume basis of the solid solution particles was 9 μm. Also, the BET specific surface area of the solid solution particles was 5.0 m$^2$/g.

The crystal structure of the nickel hydroxide solid solution particles thus produced was measured by powder X-ray diffraction method. The measurement conditions were as follows.

[Measuring device] Powder X-ray diffractometer "RINT 1400", available from Rigaku Corporation

[Anticathode] Cu

[Filter] Ni

[Tube voltage] 40 kV

[Tube current] 100 mA

[Sampling angle] 0.02°

[Scanning speed] 3.0°/minute

[Divergency slit] ½°

[Scattering slit] ½°

The diffraction peak derived from the (001) plane of the nickel hydroxide solid solution particles obtained was observed around 2θ=19°. The half-width of this diffraction peak was 0.55°, and the peak height thereof was 5,800 cps under the above-mentioned measurement conditions. Also, the ratio of the peak height to the half-width, which serves as a measure of the degree of crystallinity, ([peak height]/[half-width]), was 10,540. From these values, it was found that the nickel hydroxide solid solution obtained was relatively highly crystalline.

Subsequently, the spherical nickel hydroxide solid solution particles obtained were subjected to a chemical oxidization treatment, to obtain spherical nickel oxyhydroxide.

First, the above-mentioned nickel hydroxide solid solution particles were injected into a 0.5 mol/L aqueous solution of sodium hydroxide. An aqueous solution containing sodium hypochlorite that serves as an oxidant (effective chlorine concentration: 5% by weight) was then added thereto. This mixture was stirred to convert the nickel hydroxide solid solution particles to nickel oxyhydroxide solid solution particles. Then, the amount "x" of the oxidant added, the reaction atmosphere temperature "y", and the oxidization treatment time (stirring time) "z" were varied, as shown in Table 1.

It should be noted that the amount of the oxidant added is expressed in equivalent units, in which 1 equivalent is defined as the amount that is theoretically capable of increasing the oxidation number of the whole nickel contained in the nickel hydroxide by one.

Also, with respect to the oxidation treatment time (stirring time), the shortest treatment time (4 hours) is defined as 1, and the actual treatment time is expressed as a multiple thereof.

The obtained particles were sufficiently washed with water and then vacuum-dried at 60° to obtain spherical nickel oxyhydroxide solid solution particles 1 to 27. These spherical nickel oxyhydroxide particles had a mean particle size of about 10 μm.

TABLE 1

| Sample number (nickel oxyhydroxide) | Added amount of oxidant x (equivalent) | Reaction atmosphere temperature y (° C.) | Oxidation treatment time z (normalized value) |
|---|---|---|---|
| 1 | 1 | 40 | 1 |
| 2 | 1 | 40 | 1.5 |
| 3 | 1 | 40 | 2 |
| 4 | 1 | 50 | 1 |
| 5 | 1 | 50 | 1.5 |
| 6 | 1 | 50 | 2 |
| 7 | 1 | 60 | 1 |
| 8 | 1 | 60 | 1.5 |
| 9 | 1 | 60 | 2 |
| 10 | 1.2 | 40 | 1 |
| 11 | 1.2 | 40 | 1.5 |
| 12 | 1.2 | 40 | 2 |
| 13 | 1.2 | 50 | 1 |
| 14 | 1.2 | 50 | 1.5 |
| 15 | 1.2 | 50 | 2 |
| 16 | 1.2 | 60 | 1 |
| 17 | 1.2 | 60 | 1.5 |
| 18 | 1.2 | 60 | 2 |
| 19 | 1.4 | 40 | 1 |
| 20 | 1.4 | 40 | 1.5 |
| 21 | 1.4 | 40 | 2 |
| 22 | 1.4 | 50 | 1 |
| 23 | 1.4 | 50 | 1.5 |
| 24 | 1.4 | 50 | 2 |
| 25 | 1.4 | 60 | 1 |
| 26 | 1.4 | 60 | 1.5 |
| 27 | 1.4 | 60 | 2 |

Next, in order to examine the crystal structure of the obtained spherical nickel oxyhydroxide solid solution particles 1 to 27, powder X-ray diffraction measurements were conducted under the same conditions as the measurement conditions of the above-described nickel hydroxide solid solution particles.

Figure 2:
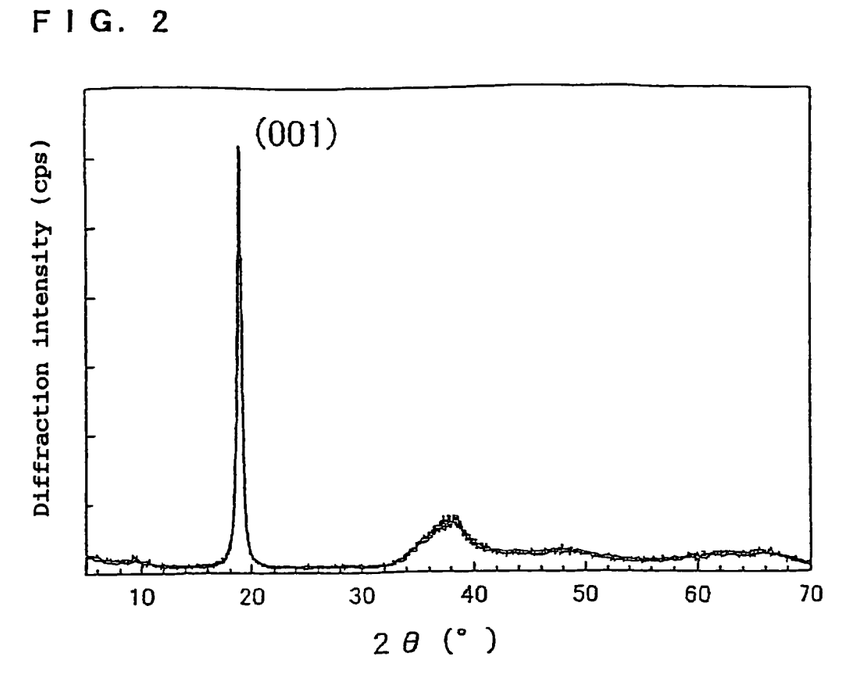
FIG. 2 is a powder X-ray diffraction profile of nickel oxyhydroxide solid solution particles 2 used in an example of the present invention.

As an example, a diffraction profile of nickel oxyhydroxide solid solution particles 2 is shown in FIG. 2.

A strong peak derived from the (001) plane (the crystal face perpendicular to the "c" axis) was observed around 2θ=19°, just like β-type nickel hydroxide.

Also, it is known that in an X-ray diffraction profile of β-type nickel hydroxide, the diffraction peak derived from the crystal faces related to the periodic arrangement of ions in the direction of the "a" axis (the (100) plane and the (101) plane) appears in a region of 2θ=30 to 40°. However, this peak becomes broad when nickel hydroxide is oxidized. In the diffraction profile of FIG. 2, this peak could not be identified clearly.

Accordingly, the obtained nickel oxyhydroxide basically has the crystal structure of β-type nickel oxyhydroxide free from elongated interplanar spacings.

Figure 3:
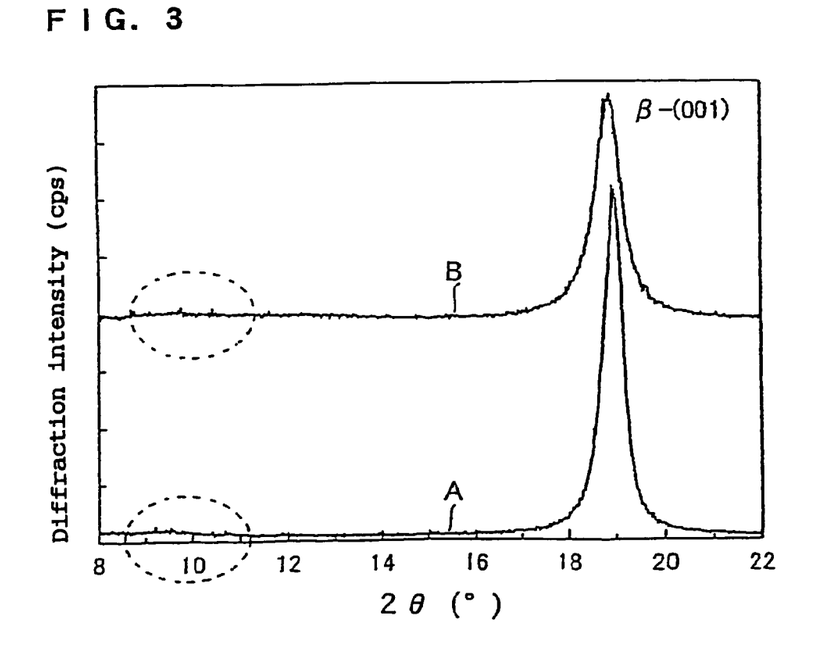
FIG. 3 is an enlarged view of a powder X-ray diffraction profile (A) of nickel oxyhydroxide solid solution particles 2 and a powder X-ray diffraction profile (B) of solid solution particles 26, in a low angle region.

Next, an enlarged view of the diffraction profile (A) of nickel oxyhydroxide solid solution particle 2 and the diffraction profile (B) of nickel oxyhydroxide solid solution particle 26 in a low angle region is shown in FIG. 3.

The difference in oxidation conditions caused a change in the half-width of the diffraction peak derived from the (001) plane of the nickel oxyhydroxide and the peak height thereof. With the solid solution particles 26, the peak half-width of the diffraction peak derived from the (001) plane increased and the peak intensity decreased, in comparison with the solid solution particles 2. From this result, it has been found that the crystallinity of the solid solution particles 26 is lower than that of the solid solution particles 2.

Also, with the solid solution particles 26 having a lower crystallinity, a diffraction peak seemingly derived from inactive γ-type nickel oxyhydroxide appeared around 2θ=10°, and the peak intensity thereof tended to increase. It should be noted that inactive γ-type nickel oxyhydroxide refers to one in which the interplanar spacing is significantly longer than the interplanar spacing of the normal γ-type structure.

Table 2 shows the half-width of the diffraction peak derived from the (001) plane, the peak height of the diffraction peak derived from the (001) plane, and the ratio of the peak height to the half-width ([peak height]/[half-width]) (this ratio serves as a measure of the degree of crystallinity), obtained by the above-mentioned powder X-ray diffraction measurements of the nickel oxyhydroxide solid solution particles 1 to 27.

Also, the mean valence of the nickel contained in the nickel oxyhydroxide solid solution particles 1 to 27 was obtained in the above manner.

Table 2 also shows the results thus obtained.

TABLE 2

| Sample number (nickel oxyhydroxide) | Half width (°/2θ) | Peak height (cps) | [Peak height]/ [half-width] | Mean valence of nickel |
|---|---|---|---|---|
| 1 | 0.59 | 5770 | 9780 | 2.95 |
| 2 | 0.55 | 6110 | 11109 | 2.98 |
| 3 | 0.51 | 6520 | 12784 | 3.04 |
| 4 | 0.65 | 4510 | 6938 | 2.99 |
| 5 | 0.62 | 5040 | 8129 | 3.02 |
| 6 | 0.59 | 5620 | 9525 | 3.05 |
| 7 | 0.64 | 4650 | 7266 | 3.01 |
| 8 | 0.63 | 4820 | 7651 | 3.03 |
| 9 | 0.61 | 5120 | 8393 | 3.05 |
| 10 | 0.62 | 4860 | 7839 | 2.97 |
| 11 | 0.57 | 5830 | 10228 | 2.99 |
| 12 | 0.52 | 6260 | 12038 | 3.05 |
| 13 | 0.65 | 4400 | 6769 | 3.02 |
| 14 | 0.61 | 5020 | 8230 | 3.04 |
| 15 | 0.57 | 5460 | 9579 | 3.05 |
| 16 | 0.69 | 4120 | 5971 | 3.03 |
| 17 | 0.66 | 4350 | 6591 | 3.03 |
| 18 | 0.64 | 4560 | 7125 | 3.04 |
| 19 | 0.64 | 4670 | 7297 | 2.99 |
| 20 | 0.61 | 4920 | 8066 | 3.01 |
| 21 | 0.54 | 5950 | 11019 | 3.05 |
| 22 | 0.64 | 4310 | 6734 | 3.02 |
| 23 | 0.63 | 4560 | 7238 | 3.04 |
| 24 | 0.58 | 5560 | 9586 | 3.05 |
| 25 | 0.66 | 4250 | 6439 | 3.01 |
| 26 | 0.65 | 4310 | 6631 | 3.03 |
| 27 | 0.63 | 4600 | 7302 | 3.04 |

When the amount "x" of the oxidant added and the reaction atmosphere temperature "y" were the same, the mean valence of nickel increased with the increase in the oxidation treatment time "z". Also, with the increase in the oxidation treatment time "z", the half-width of the diffraction peak derived from the (001) plane decreased and the peak height thereof increased. That is, it has been found that the crystallinity improves.

In the chemical oxidation of nickel hydroxide by an oxidant, the crystallites of nickel hydroxide are destroyed or become finer at an early stage of the process of pulling out protons and electrons from the nickel hydroxide. When the chemical oxidation of nickel proceeds to an extent that the mean valence of nickel is around trivalence, the nickel re-aligns in the direction of the "c" axis of the crystals of nickel oxyhydroxide. This suggests an improvement in the crystallinity of the nickel oxyhydroxide.

On the other hand, when the amount "x" of the oxidant added is so large as 1.2 to 1.4 equivalents and the reaction atmosphere temperature "y" is so high as 50 to 60° C., the crystallinity of the resultant nickel oxyhydroxide tended to lower. This is presumably because in the early stage of the oxidation reaction, the reaction of pulling out protons or electrons from the nickel hydroxide occurred very vigorously, so that the crystallites became excessively fine. It should be noted that such low crystalline nickel oxyhydroxide solid solution particles exhibited a tendency to produce the above-mentioned inactive γ species at high rates.

Next, alkaline batteries, each containing one of such nickel oxyhydroxide 1 to 27 as the positive electrode active material, were produced as follows.

(Preparation of Positive Electrode)

The nickel oxyhydroxide solid solution particles obtained, manganese dioxide, and graphite were blended in a weight ratio of 50:50:5. Further, 5 parts by weight of zinc oxide was added thereto per 100 parts by weight of the nickel oxyhydroxide solid solution particles. Next, 1 part by weight of an electrolyte was added thereto per 100 parts by weight of the positive electrode active material (the total of the nickel oxyhydroxide solid solution particles and the manganese dioxide), to form a mixture. This mixture was stirred with a mixer to obtain granular matter having a predetermined particle size. The obtained granular matter was pressure-molded into a hollow cylindrical shape. In this way, positive electrode material mixtures 1 to 27 were obtained.

(Preparation of Negative Electrode)

A gelled negative electrode was prepared by mixing poly sodium acrylate serving as a gelling agent, an alkaline electrolyte, and zinc powder serving as a negative electrode active material in a weight ratio of 2.5:100:200. As the alkaline electrolyte, an aqueous solution of 40% by weight potassium hydroxide was used.

(Production of Alkaline Battery)

Using positive electrode material mixtures and gelled negative electrodes obtained in the above manner, AA-size alkaline batteries as illustrated in FIG. 1 were produced.

The positive electrode case was made of a nickel-plated steel plate. The inner face of the positive electrode case was provided with a graphite coating film.

A plurality of the above-described positive electrode material mixtures were inserted into the positive electrode case, and then, these positive electrode mixtures were again pressurized so that they closely adhered to the inner face of the positive electrode case.

Next, a separator and an insulating cap were inserted inside the positive electrode material mixtures. An electrolyte (an aqueous solution of 40% by weight potassium hydroxide)

was then injected into the battery case, to wet the separator and the positive electrode material mixtures.

After the injection of the electrolyte, the above-mentioned gelled negative electrode was filled inside the separator. Thereafter, a negative electrode current collector integrated with a sealing plate and a bottom plate was inserted into the gelled negative electrode. The opening end of the positive electrode case was crimped onto the bottom plate with the sealing plate interposed therebetween, to seal the opening of the positive electrode case. Lastly, the outer surface of the positive electrode case was coated with a jacket label, to complete a battery.

Batteries thus produced were named batteries 1 to 21. Among them, batteries 2, 3, 11, 12, and 21 are the batteries of this example. Also, the other batteries are comparative batteries.

(Evaluation)

The alkaline batteries produced were continuously discharged at a constant power of 1 W at 20° C. At this time, the discharge duration until the battery voltage reached a cut-off voltage of 0.9 V was measured. The results obtained are shown in Table 3. In Table 3, the discharge duration of the battery 2 was defined as 100, and the discharge durations of the other batteries were normalized.

TABLE 3

| Sample number (nickel oxyhydroxide) | | Discharge duration (normalized value) |
|---|---|---|
| 1 | Comparative battery 1 | 91 |
| 2 | Battery 2 | 100 |
| 3 | Battery 3 | 101 |
| 4 | Comparative battery 4 | 92 |
| 5 | Comparative battery 5 | 92 |
| 6 | Comparative battery 6 | 93 |
| 7 | Comparative battery 7 | 91 |
| 8 | Comparative battery 8 | 92 |
| 9 | Comparative battery 9 | 92 |
| 10 | Comparative battery 10 | 90 |
| 11 | Battery 11 | 100 |
| 12 | Battery 12 | 102 |
| 13 | Comparative battery 13 | 91 |
| 14 | Comparative battery 14 | 92 |
| 15 | Comparative battery 15 | 92 |
| 16 | Comparative battery 16 | 90 |
| 17 | Comparative battery 17 | 89 |
| 18 | Comparative battery 18 | 90 |
| 19 | Comparative battery 19 | 91 |
| 20 | Comparative battery 20 | 93 |
| 21 | Battery 21 | 102 |
| 22 | Comparative battery 22 | 92 |
| 23 | Comparative battery 23 | 92 |
| 24 | Comparative battery 24 | 93 |
| 25 | Comparative battery 25 | 90 |
| 26 | Comparative battery 26 | 92 |
| 27 | Comparative battery 27 | 91 |

From Table 3, it can be seen that the batteries 2, 3, 11, 12, and 21 have longer discharge durations than the comparative batteries. The nickel oxyhydroxide contained in these batteries has relatively high crystallinity, in comparison with the nickel oxyhydroxide contained in the comparative batteries. In such highly crystalline nickel oxyhydroxide, the reduction reaction of nickel during discharging proceeds smoothly. Therefore, it can also be thought that the electrical capacity thereof is heightened to a maximum in a heavy-load discharge.

Also, among the batteries 2, 3, 11, 12, and 21, the batteries 3, 12, and 21, in which the mean valence of nickel contained in nickel oxyhydroxide is 3 or more, have longer discharge durations than the other batteries. Therefore, it is preferred that the mean valence of the nickel contained in the nickel oxyhydroxide solid solution particles be 3 or more.

In the foregoing example, spherical nickel oxyhydroxide solid solution particles including cobalt and zinc that are dissolved in the form of solid solution in their crystals were used. Besides such particles, the same effects can be obtained from any spherical nickel oxyhydroxide in which the half-width of the diffraction peak derived from the (001) plane, the ratio of the peak height of the diffraction peak derived from the (001) plane to the half-width, and the mean valence of nickel are in the above-mentioned ranges.

It should be noted that the manufacturing method of such highly crystalline, spherical nickel oxyhydroxide is not to be limited to the method described in this example.

Also, such spherical nickel oxyhydroxide may carry a cobalt oxide containing cobalt that has a mean valence greater than 3.0 (e.g., a highly conductive cobalt oxide such as γ-cobalt oxyhydroxide). This can further enhance the characteristics of collecting electrons from nickel oxyhydroxide, thereby enabling a further increase in energy density.

In preparing the positive electrode material mixture, the blending ratio of the spherical nickel oxyhydroxide solid solution particles, manganese dioxide, and graphite was 50:50:5, but there is no limitation to this ratio.

Further, in the foregoing example, 5 parts by weight of zinc oxide per 100 parts by weight of the spherical nickel oxyhydroxide was added to the positive electrode material mixture (from the viewpoint of improving storage characteristics). Instead of zinc oxides such as zinc (II) oxide, one of calcium oxides, yttrium oxides, and titanium oxides may be used. Also, the amount of addition is preferably in a range of 0.1 to 10 parts by weight per 100 parts by weight of the spherical nickel oxyhydroxide.

INDUSTRIAL APPLICABILITY

The present invention can provide an alkaline battery having excellent heavy-load discharge characteristics and high energy densities.

The invention claimed is:

1. An alkaline primary battery comprising: a positive electrode comprising a positive electrode active material; a gelled negative electrode comprising zinc powder serving as a negative electrode active material; a separator disposed between said positive electrode and said negative electrode; and an electrolyte, wherein said positive electrode active material comprises spherical nickel oxyhydroxide comprising a crystal of a β-type structure, a powder X-ray diffraction profile of said spherical nickel oxyhydroxide obtained using a Cu target is such that a half-width W of a diffraction peak P derived from a (001) plane is 0.6° or less, the ratio H/W of a height H of said peak P to said half-width W is 10,000 or more, and nickel contained in said spherical nickel oxyhydroxide has a mean valence of 2.95 or more.

2. The alkaline primary battery in accordance with claim 1, wherein the nickel contained in said spherical nickel oxyhydroxide has a mean valence of 3 or more.

3. The alkaline primary battery in accordance with claim 1, wherein said spherical nickel oxyhydroxide carries a cobalt oxide, and a cobalt contained in said cobalt oxide has a mean valence of greater than 3.

4. The alkaline primary battery in accordance with claim 3, wherein said spherical nickel oxyhydroxide carries said cobalt oxide in an amount of 0.5 to 15 parts by weight per 100 parts by weight of said spherical nickel oxyhydroxide.

5. The alkaline primary battery in accordance with claim 1, wherein said positive electrode further contains at least one additive selected from the group consisting of zinc oxides, calcium oxides, yttrium oxides, and titanium oxides.

6. The alkaline primary battery in accordance with claim 5, wherein said positive electrode contains 0.1 to 10 parts by weight of said additive per 100 parts by weight of said spherical nickel oxyhydroxide.

* * * * *